United States Patent [19]

Omori et al.

[11] Patent Number: 4,558,927

[45] Date of Patent: Dec. 17, 1985

[54] ZOOM LENS ASSEMBLY

[75] Inventors: Sachio Omori, Yokosuka; Hideshi Naito, Tokyo; Hitoshi Imanari, Funabashi; Takeshi Muryoi, Chigasaki, all of Japan

[73] Assignee: Nippon Kogaku K.K., Tokyo, Japan

[21] Appl. No.: 523,364

[22] Filed: Aug. 15, 1983

[30] Foreign Application Priority Data

Aug. 21, 1982 [JP] Japan .......................... 57-125514[U]

[51] Int. Cl.⁴ .......................... G02B 7/10; G02B 15/18
[52] U.S. Cl. .................................. 350/429; 350/449; 350/450
[58] Field of Search ............... 350/429, 430, 427, 428, 350/257

[56] References Cited

U.S. PATENT DOCUMENTS

| 3,090,282 | 5/1963 | Angenieux | 350/429 |
|---|---|---|---|
| 3,163,701 | 12/1964 | Staubach | 350/429 |
| 3,765,748 | 10/1973 | Mito | 350/429 |
| 3,877,794 | 4/1975 | Kulle et al. | 350/429 |
| 4,054,372 | 10/1977 | Schroeder | 350/429 |
| 4,110,006 | 8/1978 | Ikemori | 350/427 |

FOREIGN PATENT DOCUMENTS

| 1112979 | 3/1956 | France | 350/429 |
|---|---|---|---|
| 80011 | 7/1981 | Japan | 350/430 |

*Primary Examiner*—Jon W. Henry
*Attorney, Agent, or Firm*—Fitzpatrick, Cella, Harper & Scinto

[57] ABSTRACT

A zoom lens assembly comprises an optical system including, in succession from the object side, a stationary lens group, a first movable lens group, a second movable lens group and a third movable lens group, a stationary barrel for holding the stationary lens group, first, second and third movable barrel members disposed in the stationary barrel for sliding movement in the direction of the optical axis and holding the first, second and third movable lens groups, respectively, and lens driving means including means for sliding the first movable barrel member for focusing and means for sliding the second and third movable barrel members for zooming.

10 Claims, 7 Drawing Figures

ZOOM LENS ASSEMBLY

BACKGROUND OF THE INVENTION

1. Field of the Invention

This invention relates to a zoom lens assembly, and more particularly to the structure of the barrel of a zoom lens system in which a first group is a stationary lens group relative to movable lens groups shifted for focusing and zooming.

2. Description of the Prior Art

In the conventional zoom lens barrel of a construction in which a first lens group is shifted in the direction of the optical axis for focusing, the torque necessary for focusing operation has been great for the movement of the first lens group which has a relatively large lens diameter, and the operability has been poor because the operating portion is moved with the shift of the first lens group, and further, the position of the center of gravity of the entire lens barrel has been greatly varied. Particularly, zoom lenses of long focal length have suffered from the disadvantage that when mounted to cameras, they are difficult to use in the photographing operation.

For this reason, zoom lens optical systems in which the first lens group is stationary are proposed, for example, in U.S. Pat. No. 4,110,006, etc. and have been attracting attention in recent years.

SUMMARY OF THE INVENTION

It is a primary object of the present invention to provide a zoom lens assembly which is simple in construction and excellent in operability.

It is another object of the present invention to provide a zoom lens assembly which is provided with an optical system in which a first lens group is fixed relative to movable lens groups shifted for focusing and zooming and which is excellent in operability.

The zoom lens assembly of the present invention is provided with an optical system including, in succession from the object side, a stationary lens group, a first movable lens group, a second movable lens group and a third movable lens group, first, second and third movable lens barrels holding the movable lens groups, respectively, and operating means for moving the first movable lens barrel for focusing and moving the second and third movable lens barrels for zooming.

In a preferred embodiment of the present invention, the second and third movable lens barrels are both moved in spaces of the same inside diameter in opposite directions along the inner peripheral surface of the stationary barrel, and each of the second and third movable lens barrels is formed with a foot extending toward the opposite movable lens barrel while being in contact with the inner peripheral surface of the stationary barrel, and the foot of one of the barrels is circumferentially engaged with the foot of the other barrel, whereby the two movable barrels are coupled together only in the direction of rotation.

Further, in an embodiment of the present invention, an aperture stop is provided between the first movable lens group and the second movable lens group, and another stop for cutting harmful lightis provided rearwardly of the third movable lens group. In such a zoom lens optical system, the aperture value of the lens system is usually varied in accordance with zooming and to display the varied aperture value, a display device is provided which is operatively associated with zooming operation. It is preferable that said another stop have its stop opening varied in response to zooming operation for the purpose of effectively cutting harmful light in each zooming position.

Further, in the preferred embodiment of the present invention, there is provided a click stop mechanism operated in a preset focusing position, and the position in which this click stop is operated can be set to any distance between the close distance and infinity.

The invention will become more fully apparent from the following detailed description thereof taken in conjunction with the accompanying drawings.

DESCRIPTION OF THE PREFERRED EMBODIMENT

Figure 1:
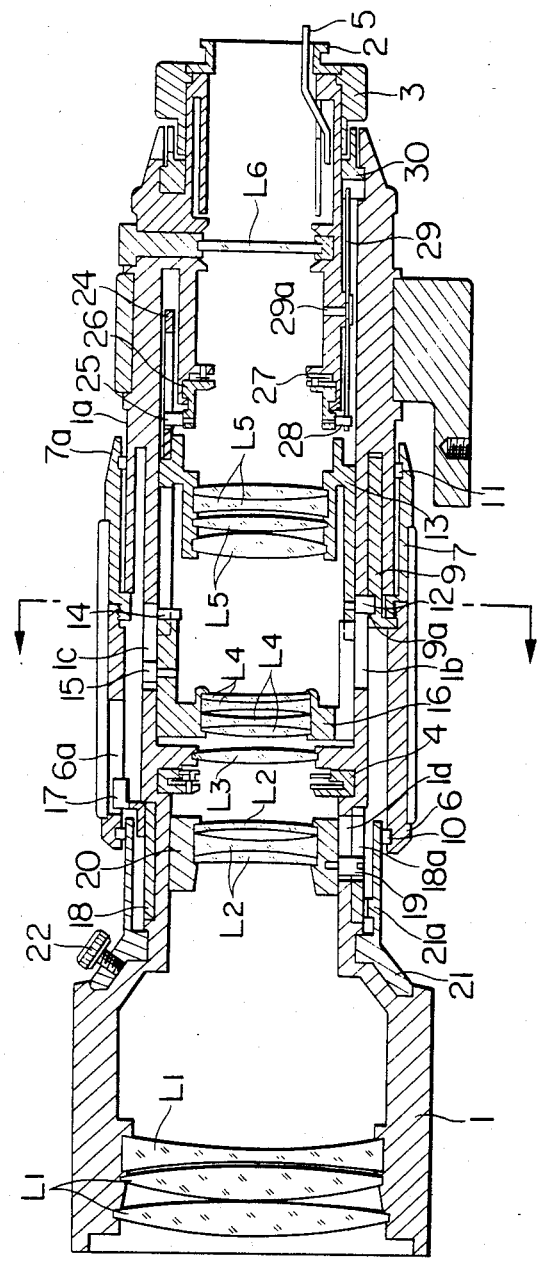
FIG. 1 is a cross-sectional view of a zoom lens assembly according to an embodiment of the present invention.

In an embodiment of the zoom lens barrel shown in FIG. 1, the focal length of the lens is set to the shortest, i.e., the wide end, and the lens is set in a state focused to an object to be photographed at infinity. A first group L1 of the picture-taking lens, with a third group L3, is attached to a stationary barrel and is not moved during zooming or focusing. Both of the first group L1 and the third group L3 have a positive refractive power. The first group L1 and a second group L2 together constitute an afocal system relative to the object to be photographed at infinity and therefore, the third group L3 is for converging the light from these. Accordingly, if the first group and the second group are a converging system, the third group L3 can be eliminated. The second group L2 has a negative refractive power and is moved in the direction of the optical axis during focusing as will later be described. A fourth group L4 and a fifth group L5 are moved on the optical axis in opposite directions during zooming. The fourth group L4 has a negative refractive power, and the fifth group L5 has a positive refractive power.

A filter L6 is disposed rearwardly of the picturetaking lens and is removable in order that the type thereof may be changed. A bayonet mount 2 is removably mounted on the bayonet mount of a camera, as is well known, and fastened to the stationary barrel 1 by a small screw. An aperture ring 3 is sandwiched between the stationary barrel 1 and the mount 2, is fixed in the direction of the optical axis, and is rotatively operated about the optical axis to preset the aperture required during photographing.

A diaphragm mechanism 4 for adjusting the quantity of light, although not shown in detail herein, comprises diaphragm blades and a known mechanism for driving the diaphragm blades to change the aperture diameter. The diaphragm mechanism 4 is an auto diaphragm mechanism which, whenever mounted to the camera, is opened to the size of the open aperture by an aperture lever 5 and is stopped down to a predetermined aperture by the operation of the aperture lever only during photographing. The aperture ring 3 and the diaphragm mechanism 4 are connected together by a lever, not shown, and the aperture value set by the aperture ring 3 is transmitted to the diaphragm mechanism 4, whereby the aperture diameter is determined.

An operating ring for effecting zooming and focusing comprises a member 6 having a rectilinear groove 6a extending in the direction of the optical axis, and a member 7 having a distance scale 7a, the members 6 and 7 being made integral with each other by screws. On the outer periphery 1a of the stationary barrel 1 which is opposed to the distance scale 7a, a distance index line is formed and focal length divisions indicated by the end surface portion of the distance scale 7a moved in the direction of the optical axis by zooming are also formed in the direction of the optical axis.

A zooming interlocking member 9 has a groove 9a circumferentially thereof and meshes with a pin 12 by means of this groove 9a. The interlocking member 9 is sandwiched between and made integral with the aforementioned members 6 and 7. Cushion members 10 and 11 are attached to the inner peripheries of the members 6 and 7 so as to ensure smooth movement of the operating ring. The operating ring may be moved in the direction of the optical axis for zooming and about the optical axis for focusing.

Figure 2:
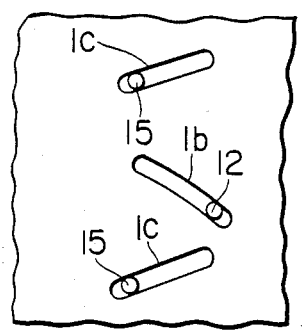
FIG. 2 is a fragmentary developed view of a stationary barrel 1.
Figure 3:
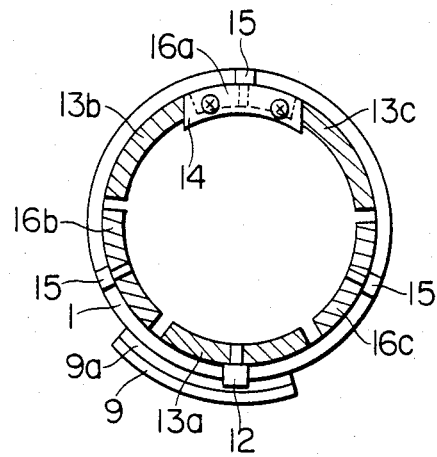
FIG. 3 is a cross-sectional view taken along the arrows of FIG. 1.

A lens barrel 13 holding the fifth lens group is formed with three feet 13a, 13b and 13c extending in the direction of the optical axis, as shown in FIG. 3, and an interlocking pin 12 extending through a cam slot 1b in the stationary barrel 1 and fitted in the groove 9a of the interlocking member 9, as shown in FIG. 2, is provided on the foot 13a. These feet 13a, 13b and 13c are closely fitted to the inner periphery of the stationary barrel 1, thereby precisely maintaining the matching accuracy of the optical axis of the fifth lens group L5 relative to the center axis of the barrel. A lens barrel 16 holding the fourth lens group L4 is provided on the inner periphery of the barrel 1 having the same diameter as the lens barrel 13, and has three feet 16a, 16b and 16c as shown in FIG. 3. These feet are disposed in such an angle relation in which they do not strike against the three feet 13a–13c of the lens barrel 13. A key 14 is fastened to the end surface of the foot 16a by a small screw. The key 14 is disposed slidably in the direction of the optical axis in the gap between the feet 13b and 13c of the lens barrel 13 and transmits the rotational force of the lens barrel 13 to the lens barrel 16. A pin 15 is studded in each of the three feet 16a, 16b and 16c of the lens barrel 16 and is engaged with the cam slot 1c of the stationary barrel 1 to control the movement of the lens barrel 16 in the direction of the optical axis, as shown in FIG. 2.

Figure 4:
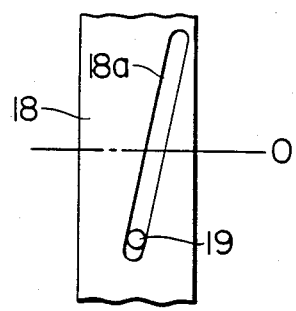
FIG. 4 is a fragmentary developed view of a cam member 18.
Figure 5:
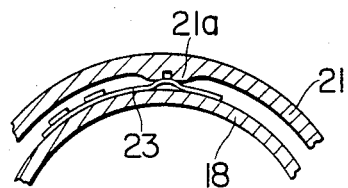
FIG. 5 is an enlarged cross-sectional view showing the structure of a click mechanism.

One end of a focusing interlocking member 17 is engaged with the aforementioned rectilinear groove 6a and transmits the rotation of the operating ring to a focusing cam member 18 secured to the other end of the interlocking member 17. The cam member 18 has a cam slot 18a as shown in FIG. 4, and also has a plate spring 23 (FIG. 5) fastened thereto by means of small screws. A ring 21 for presetting the distance is rotatable relative to the stationary barrel 1 and can be set at any position on the stationary barrel 1 against movement by a set screw 22. A click stopper groove 21a is formed in the inner side of the preset ring 21, and it together with the plate spring 23 constitutes a click stop mechanism. Further, the outer periphery of the preset ring 21 also provides a slide guide for the cushion member 10 of the operating ring. A pin 19 is studded in a lens barrel 20 holding the second lens group L2. The pin 19 extends through a rectilinear groove 1d provided in the stationary barrel 1 and is engaged with the cam slot 18a of the cam member 18.

Figure 6:
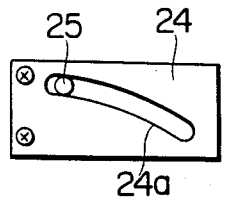
FIG. 6 is a developed view of a transmitting member 24.
Figure 7:
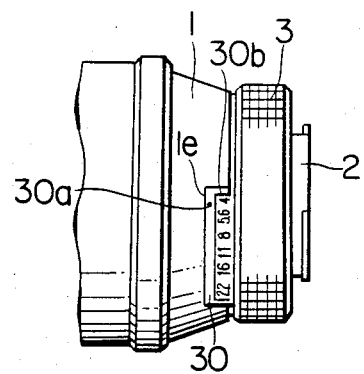
FIG. 7 is a pictorial view of a rear bayonet 2 and an aperture ring 3.

A rotation transmitting member 24 has one end thereof fastened to the end portion of the lens barrel 13 by a small screw and is movable with the lens barrel 13. The transmitting member 24 has a cam slot 24a as shown in FIG. 6. A pin 25 is studded in a ring 26 for driving a diaphragm blade 27 for cutting a harmful oblique light flux which may cause a reduced quality of picture. The pin 25 is engaged with the cam slot 24a of the transmitting member 24 and the driving ring 26 has a degree of freedom only in the direction of rotation and therefore, the ring 26 is rotatable through the transmitting member 24. The driving ring 26 has a plurality of radial cam slots formed in the end surface thereof as is well known, and the dowels of a plurality of diaphragm blades 27 for cutting a harmful light are engaged with these cam slots, so that the area of the opening of the diaphragm is varied by rotation of the ring 26. A pin 28 is studded at one end of the ring 26, and this pin 28 is engaged with an interlocking lever 29 pivotable about a shaft 29a and further, the lever 29 is engaged with an index ring 30, so that the ring 30 is rotatable by rotation of the ring 26. The ring 30 has an aperture index 30a and a cut-away window 30b in the vicinity thereof, as shown in FIG. 7, and further, the end portion of the stationary barrel 1 also has a large cut-away window 1e capable of exposing the index 30a and the cut-away window 30b, so that the index 30a and the display of aperture values engraved around the aperture ring 3 can be seen.

To move the optical system from the wide end condition shown in FIG. 1 to the telephoto side, the operating ring 6, 7 is rectilinearly moved toward the object to be photographed. The pin 12 engaged with the groove of the zooming interlocking member 9 by rectilinear movement of the zooming interlocking member moves to the object to be photographed while rotating along the cam 1b. Accordingly, the fifth group L5 also moves in a manner similar to the pin 12. Simultaneously therewith, by the engagement between the feet 13b, 13c of the lens barrel 13 and the key 14, only the rotation of the lens barrel 13 is transmitted to the lens barrel 16. When the rotation is transmitted to the lens barrel 16, the fourth group L4 is moved in the opposite direction to the fifth group L5, namely, in the opposite direction to the object to be photographed, along the cam portion 1c of the stationary barrel 1 by the pins 15 studded in the feet 16a, 16b and 16c of the lens barrel 16. Thus, the focal length of the lens is varied while the image plane is kept constant. In this manner, feet extending toward each other while contacting the inner periphery of the stationary barrel are formed on the two lens barrels holding the two lens groups L4 and L5 shifted during zoom and the foot of one of the barrels is caused to circumferentially intersect the foot of the other barrel, whereby the two barrels are coupled together only in the direction of rotation and moreover, the lengths of the two barrels can be made as long as possible to minimize the tilt of the two lens barrels, and this leads to the possibility of achieving stabilized accuracy of the optical performance.

By the shift of the lens barrel 13 and by the cam slot 24a of the transmitting member 24 made integral therewith, the pin 25 and the driving ring 26 are moved and the diaphragm blade 27 is changed in a direction to reduce the opening thereof, thereby appropriately cutting harmful light. Further, the movement of the driving ring 26 rotates the index ring 30 through the pin 28 and the lever 29, so that the display of the aperture value is varied to accurately indicate the aperture value varied in response to zooming.

To accomplish focusing, the operating ring 6, 7 is rotated about the optical axis. Thereupon, the cam member 18 is rotated through the intermediary of the interlocking member 17. The pin 19, which is fitted in the rectilinear groove 1d of the stationary barrel 1, is moved in the direction of the optical axis by the rotation of the cam member 18 with the aid of the cam slot 18a. Accordingly, the lens barrel 20 is rectilinearly moved in the direction of the optical axis, thereby accomplishing focusing. The second group L2 is designed to be moved from the condition of FIG. 1 toward the diaphragm mechanism for the focusing from the infinity position to the close distance position.

Presetting of the distance is effected in the following manner. First, the operating ring is rotated to adjust the index 1a and the engraved number 7a to a predetermined object distance, e.g., 10 m. Thereafter, the set screw 22 is loosened and the preset ring 21 is rotated to a position in which it is click-stopped, and in this position, the set screw 22 is tightened and the preset ring 21 is fixed relative to the stationary barrel 1. Thus, the rotation of the operating ring is always click-stopped at the previously set position of 10 m.

We claim:

1. A zoom lens assembly comprising:
   (a) an optical system including, in succession from the object side, a stationary lens group, a first movable lens group, a second movable lens group and a third movable lens group;
   (b) a stationary barrel for holding said stationary lens group;
   (c) first, second and third movable barrel members disposed on said stationary barrel for holding and axially moving said first, second and third movable lens groups, respectively;
   (d) an operating member slidable in the direction of the optical axis with respect to said stationary barrel for zooming, and rotatable about the optical axis for focusing;
   (e) first means for moving said first movable barrel member in response to the rotation of said operating member; and
   (f) second means for moving said second and third movable barrel members in response to the sliding movement of said operating member.

2. A zoom lens assembly according to claim 1, wherein said second means slides said second and third movable barrel members in opposite directions.

3. A zoom lens assembly according to claim 1, wherein said second movable barrel member is axially moved by rotation relative to said stationary barrel and has a first extension extending toward said third movable barrel member while being in contact with said inner peripheral surface, and said third movable barrel member is axially moved by rotation relative to said stationary barrel and has a second extension extending toward said second movable barrel member while being in contact with said inner peripheral surface, said first and second extensions being coupled together in the direction of rotation.

4. A zoom lens assembly according to claim 1, wherein said second and third movable barrel members are mutually movable in the direction of the optical axis and said zoom lens assembly further comprises means for coupling said second and third movable barrel members together in the direction of rotation.

5. A zoom lens assembly according to claim 1, wherein said optical system further includes another lens group held stationary by said stationary barrel between said first and second movable lens groups.

6. A zoom lens assembly according to claim 5, wherein said stationary lens group has a positive refractive power and constitutes an afocal system relative to the object in cooperation with said first movable lens group.

7. A zoom lens assembly according to claim 6, wherein said first movable lens group has a negative refractive power and said another lens group has a positive refractive power.

8. A zoom lens assembly according to claim 1, wherein said optical system has an aperture value varied in response to zooming, and said zoom lens assembly further comprises means responsive to zooming to display the aperture value of said optical system.

9. A zoom lens assembly according to claim 9, wherein said optical system further includes diaphragm means provided rearwardly of said third movable lens group for intercepting harmful light, and means responsive to the zooming to vary the aperture opening of said diaphragm means.

10. A zoom lens assembly according to claim 1, further comprises a preset member movable with respect to said stationary barrel and said operating member, first fixing means operable to fix said preset member to said stationary barrel, and second fixing means provided between said operating member and said present member to impart a biasing force in a direction for maintaining a predetermined positional relation when said operating member and said preset member are in said predetermined positional relation.

* * * * *